G. W. McKINSTRY.
OPHTHALMIC MOUNTING.
APPLICATION FILED MAY 3, 1919.
1,317,205.
Patented Sept. 30, 1919.
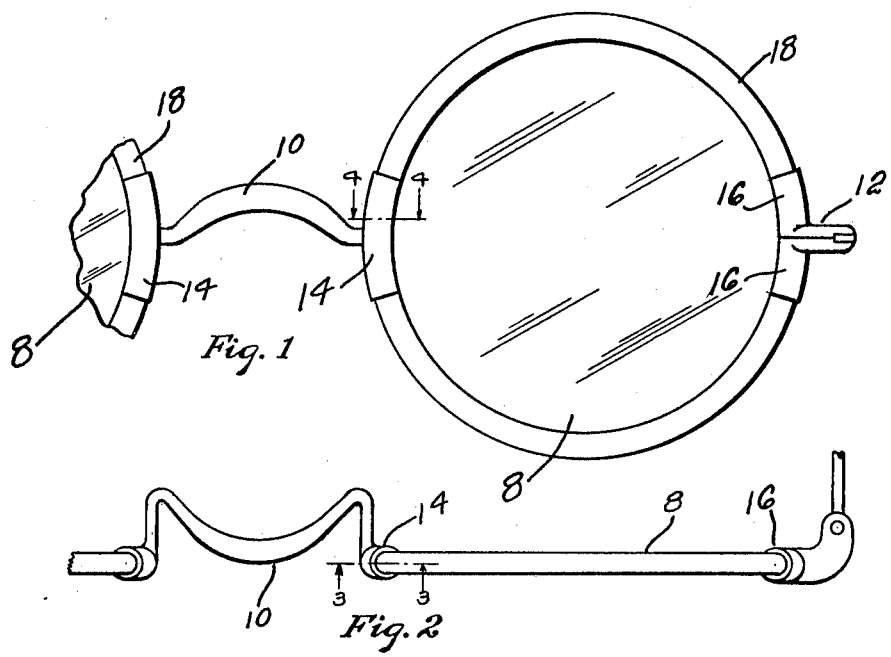
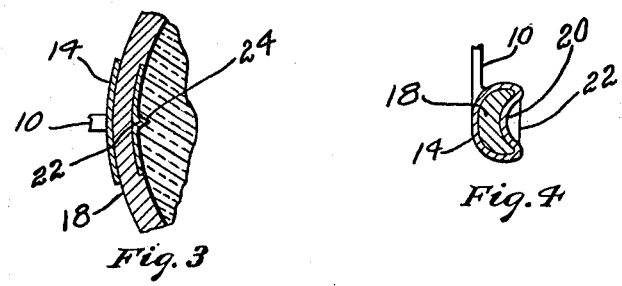
Inventor.
George W. McKinstry
By Horatio E. Bellows
Attorney.

UNITED STATES PATENT OFFICE.

GEORGE W. McKINSTRY, OF SOUTHBRIDGE, MASSACHUSETTS, ASSIGNOR TO BAY STATE OPTICAL COMPANY, A CORPORATION OF MAINE.

OPHTHALMIC MOUNTING.

1,317,205.      Specification of Letters Patent.      Patented Sept. 30, 1919.

Application filed May 3, 1919. Serial No. 294,333.

*To all whom it may concern:*

Be it known that I, GEORGE W. McKINSTRY, a citizen of the United States, residing at Southbridge, in the county of Worcester and State of Massachusetts, have invented certain new and useful Improvements in Ophthalmic Mountings, of which the following is a specification.

My invention relates to the mountings of spectacles and eyeglasses having circular nonmetallic rims.

The objects of my invention are to prevent the accidental derangement of the axes of the lenses and to attain this end in a simple and inexpensive manner, and without weakening the structure.

To the above ends essentially my invention consists in such parts and in such combinations of parts as fall within the scope of the appended claims.

In the accompanying drawings which form a part of this specification,

Figure 1 is a front elevation of a portion of a pair of spectacles or eyeglasses comprising nonmetallic rims.

Fig. 2, a plan of the same,

Fig. 3, a section on line 3—3 of Fig. 2, and

Fig. 4, a section of the rim on line 4—4 of Fig. 1.

Like reference characters indicate like parts throughout the views.

In the drawings 8 are the circular lenses, 10 the bridge, and 12 the end pieces of a frame of the nonmetallic type, wherein sleeves or straps 14 attached to or integral with the bridge, and the sleeves or straps 16 upon the end pieces, tightly and immovably embrace the nonmetallic rims having the usual internal annular grooves. The sleeves have grooves 20 to register in the annular grooves.

To prevent rotation of the lens 8 there is provided in the groove 20 of one of the sleeves 14 or 16, in this case on the sleeve 14, an oblong transversely disposed inwardly directed integral lip 22 rigid with the sleeve which registers in a transversely disposed V shaped cavity 24 in the periphery of the lens.

I claim:—

In eyeglasses or spectacles, a bridge, metallic sleeves fast to the ends of the bridge, circular nonmetallic rims rigidly embraced by the sleeves, external lips integral with the sleeves, and circular lenses mounted in the rims provided with peripheral cavities adapted to receive the lips.

In testimony whereof I have affixed my signature.

GEORGE W. McKINSTRY.

Copies of this patent may be obtained for five cents each, by addressing the "Commissioner of Patents, Washington, D. C."